No. 861,202. PATENTED JULY 23, 1907.
J. Q. BLUE & G. H. MARQUARDT.
PLOW CARRIAGE.
APPLICATION FILED NOV. 7, 1906.
3 SHEETS—SHEET 1.
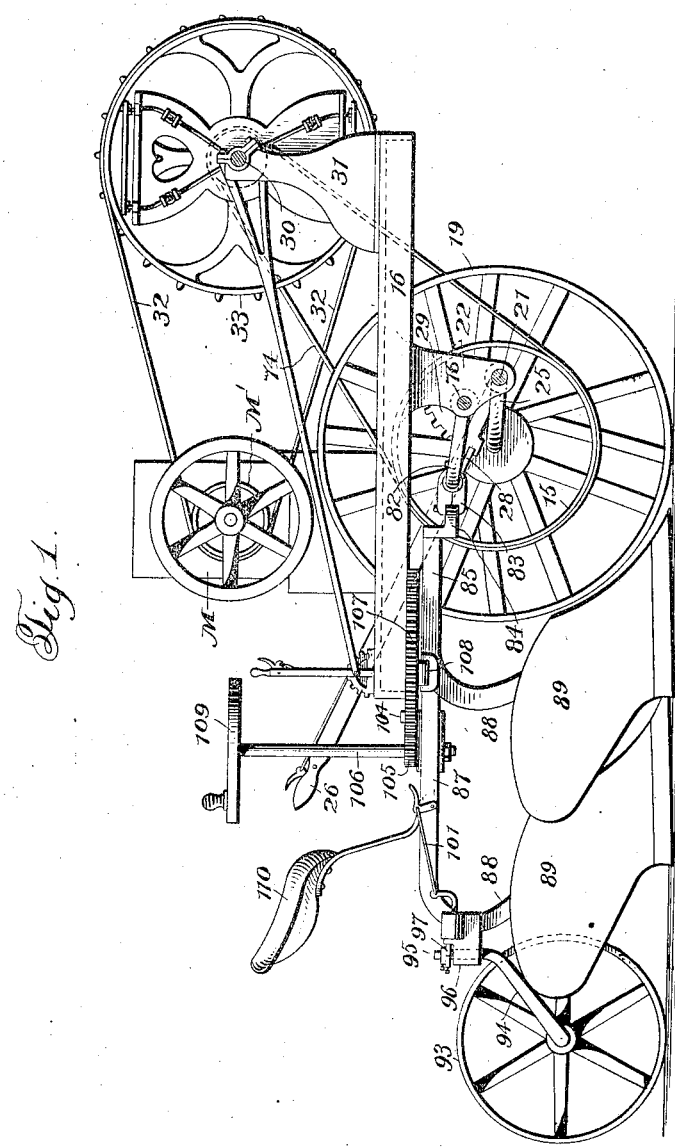

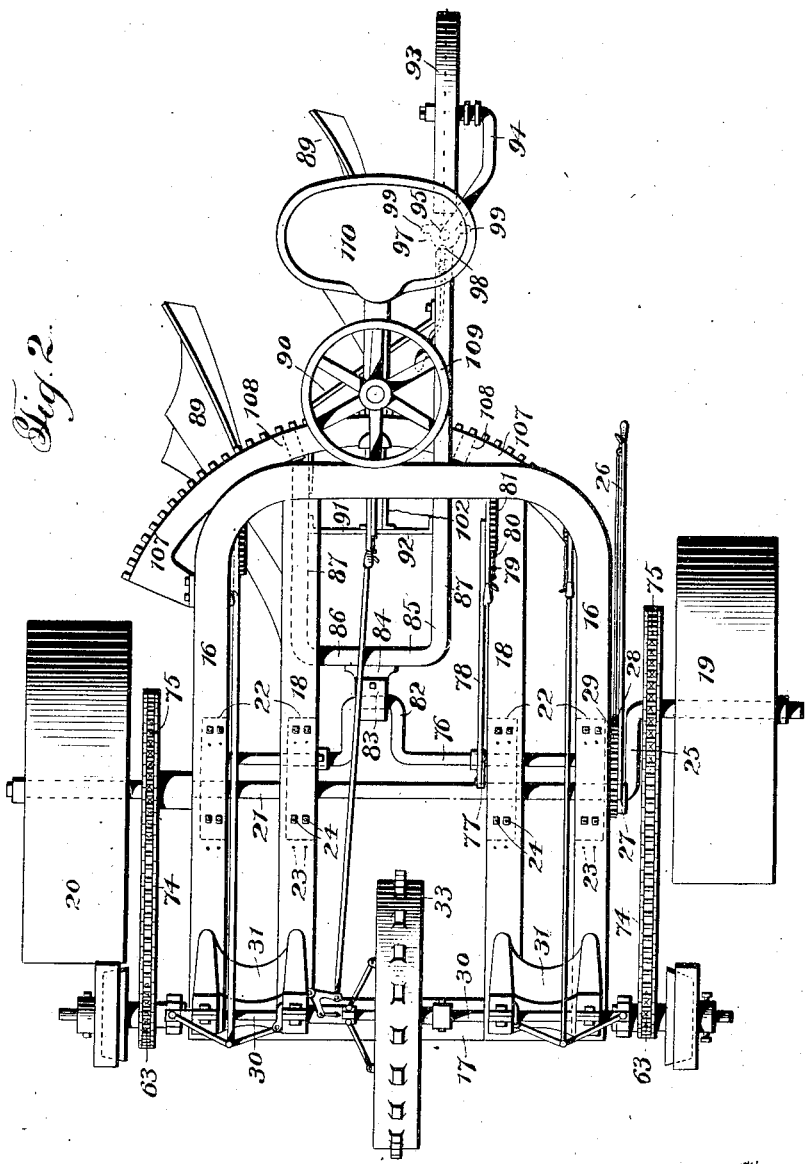

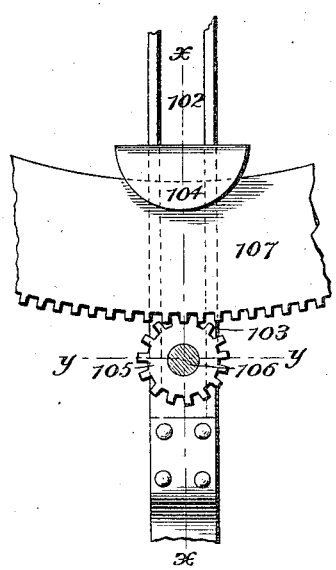
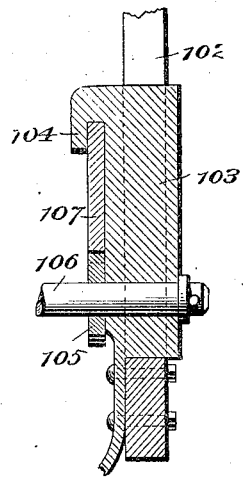
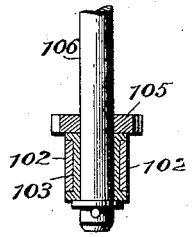
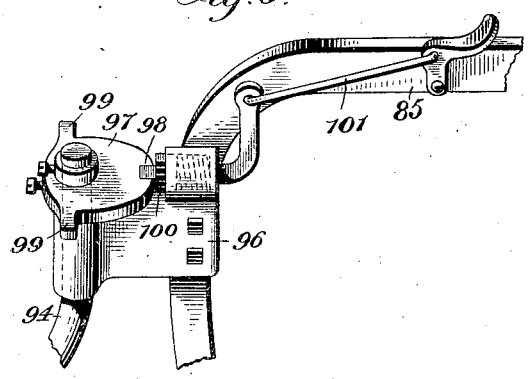

UNITED STATES PATENT OFFICE.

JOHN Q. BLUE AND GUSTAVUS H. MARQUARDT, OF SOUTH HAVEN, KANSAS.

PLOW-CARRIAGE.

No. 861,202.  Specification of Letters Patent.  Patented July 23, 1907.

Original application filed February 28, 1906, Serial No. 303,477. Divided and this application filed November 7. 1906.
Serial No. 342,386.

*To all whom it may concern:*

Be it known that we, JOHN Q. BLUE and GUSTAVUS H. MARQUARDT, citizens of the United States, residing at South Haven, in the county of Sumner and State of Kansas, have invented certain new and useful Improvements in Plow-Carriages, of which the following is a specification, reference being had therein to the accompanying drawing.

This invention relates to means for guiding agricultural implements; and, while it is especially adapted for use with mechanically-driven plows such as disclosed in our copending application for Letters Patent for motor-plow carriage, filed February 28, 1906, Serial Number 303,477, wherein the subject-matter of this application was previously disclosed, it is also susceptible of use with implements propelled by draft-animals. The machine shown and described in our said copending application includes means whereby the carriage is caused to turn at the end of a furrow, or where otherwise necessary, by operation of the main supporting-wheels, means under control of the operator being provided to readily effect this movement.

The present invention provides means for guiding the implement by manual operation of the person directing the implement, whether the machine is susceptible of being steered by the driving means or not.

Means are also provided by the present invention whereby the tilt of the plows can be easily altered, the depth of plowing changed, and the plows lifted entirely from the ground, any or all of these operations being capable of performance while the machine is either in motion or at rest.

The several parts of the guiding mechanism are so constructed and disposed that they will not become disarranged during the various movements and positions incident to alterations in the relative locations of the plows.

The various parts of the machine are so constructed and arranged as to provide an implement of very substantial construction, capable of long, efficient, and continuous service, and so organized as to be easily operable.

The details of construction and arrangement of parts contemplated by this invention are disclosed in the accompanying drawings, forming part hereof, wherein a preferable embodiment of the invention is shown, for purposes of illustration, as applied to a plow-carriage.

Like reference characters refer to corresponding parts in the several views of the drawings, of which—

Figure 1 is a view, partly in section, showing the furrow side of the implement; Fig. 2 is a plan view of the implement, with certain parts omitted; Fig. 3 is a detail top view of a portion of the steering mechanism; Fig. 4 is a sectional view, taken on the line $x—x$, Fig. 3; Fig. 5 is a sectional view, taken on the line $y—y$, Fig. 3; and Fig. 6 is a detail view of the caster-wheel support.

The machine includes a main frame comprising a U-shaped member 16 which forms the outer longitudinal members of the frame and the rear cross-member, a cross-member 17 which is attached to the forward ends of member 16, and longitudinal members 18 attached to cross-member 17 and to the cross part of member 16. The main frame is carried by supporting-wheels 19 on the land-side and 20 on the furrow side, journaled on an axle 21 secured to the frame by brackets 22 attached to the under sides of members 16 and 18. A plurality of sets of apertures 23 are provided in the main frame-members to accommodate bolts 24 which secure brackets 22, in order that those brackets may be shifted to properly balance the machine for different weights and to meet other varying conditions of service. Axle 21 is formed in the shape of a crank with an arm 25 on the land side where the land-side supporting-wheel 19 is journaled, in order that the frame may be raised and lowered and the land-side supporting-wheel may be adjusted for different depths of furrow. An operating-lever 26 for raising and lowering the land-side supporting-wheel is fulcrumed on axle 21, is attached to the crank-arm 25 near the journal of the supporting-wheel by a strap 27, and has a hand-controlled pawl 28 which is coöperable with a ratchet-segment 29 attached to one of brackets 22. A drive-shaft 30 is journaled in standards 31 attached to the top of frame-members 16 and 18 near the front of the machine.

The machine is driven by any suitable motor M located on the main frame, power being transmitted from wheel $M^1$ of the motor by means of a belt 32 to the main drive-wheel 33 on drive-shaft 30, at or near the ends of which shaft are secondary drive-wheels 63 which communicate motion to supporting-wheels 19 and 20 by means of belts 74 and wheels 75.

Rotatably mounted in brackets 22 aft of axle 21 is a shaft 76, having an arm 77 thereon which is pivotally connected with a link 78 which leads to an operating-lever 79. Lever 79 has a hand-controlled pawl 80 thereon coöperable with a fixed ratchet-segment 81. At or about the center of shaft 76 is a rearwardly-extending bell-crank 82, to which is pivotally connected a shackle 83, which in turn is pivotally connected with a tongue 84 of a plow-frame 85. Plow-frame 85 comprises a front cross-member 86 to which tongue 84 is connected, and beams 87 extending rearwardly therefrom and having down-turned portions 88 to which any suitable plow-elements 89, such as moldboards shown in the drawings, or disks, etc., are connected. Oblique member 90 and cross-members 91 and 92 connect and brace beams 87. A trailing plow-frame is thus formed.

To the rear end of land-side beam 87 is attached a caster-wheel 93 to support the rear part of the plow-frame 85. The caster-wheel is journaled on the lower end of the trailing portion 94 of spindle 95, and the spindle is journaled in the bearing 96 secured to the beam. A collar 97 is secured to spindle 95 above bearing 96. Besides holding the spindle in the bearing, collar 97 coöperates to control the swing of the caster-wheel. For this purpose the collar is formed on the side opposite the wheel with a recess 98, and at approximately ninety degrees from each side of said recess with lugs 99. A spring-controlled latch 100 secured to bearing 96 normally seats in recess 98 and holds the caster-wheel in substantially the line of draft. In turning the plow, latch 100 is released from recess 98 by foot-controlled link 101, when the caster-wheel is free to swing in either direction, the swing being limited by engagement of latch 100 with one or the other of lugs 99; and, when the turning movement is completed, and the caster-wheel again trails in the line of draft, the latch will be returned to recess 98 by action of its spring.

Between and parallel with beams 87 is a bifurcated member 102 connected with and supported by cross-members 92 and 91. Between the parts of bifurcated member 102 is held a slidable block 103. The forward part of block 103 is formed with a rearwardly-overlapping lip or lug 104, and oppositely disposed thereto is a pinion 105 carried on a steering-shaft 106 journaled in block 103. Attached to the main frame is a cogged arc 107, which is operable between pinion 105, with which it meshes, and lip 104, which holds it in proper meshing relation with said pinion. The engagement of lip 104 with arc 107 also serves to maintain the proper relation between the main and plow frames. Attached to beams 87, and interposed therebetween and arc 107, are anti-friction-rollers 108, which are arranged to sustain strain between the main frame and the plow-frame and to permit movement of said frames with respect to each other. A steering-wheel 109 is attached to shaft 106, and a seat 110 for the operator is attached to the rear end of member 102.

The machine is steered without coöperation of the supporting-wheels by means of the operation by the operator of the pinion in mesh with the cogged arc, thus serving to swing the trailing frame and guide the implement.

The plow-frame is tilted by up or down revoluble movement of the bell-crank caused by movement of the operating-lever connected with its shaft. The slight forward or aft movement of the plow-frame incident to this operation is allowed for by the sliding block carrying the steering-pinion.

The main frame is raised or lowered on the land-side supporting-wheel by movement of the cranked end of the axle on that side caused by actuation of the operating-lever connected therewith.

Having thus described our invention, what we claim as new, and desire to secure by Letters Patent, is—

1. A plow-carriage comprising a main frame, a trailing frame pivotally connected therewith, means whereby said trailing frame is tilted, a cogged arc connected with said main frame, a pinion longitudinally movable on said trailing frame and coöperating with said arc, and means associated with said pinion and engaging said arc whereby said pinion and arc are maintained in mesh during tilting movement of said trailing frame.

2. A plow-carriage comprising a main frame, a trailing frame pivotally connected therewith, means whereby said trailing frame is tilted, a cogged arc connected with said main frame, a slidable block on said trailing frame, a pinion on said block and in mesh with said arc, and means whereby the proper relation of said arc and pinion is maintained during tilting movement of said trailing frame.

3. A plow-carriage comprising a main frame, a trailing frame pivotally connected therewith, means whereby said trailing frame is tilted, a cogged arc connected with said main frame, a slidable block on said trailing frame, a pinion on said block and in mesh with said arc, and a lip on said block and overlapping said arc.

4. A plow-carriage comprising a main frame, a trailing frame pivotally connected therewith and including a bifurcated member, means whereby said trailing frame is tilted, a cogged arc connected with said main frame, a slidable block in said bifurcated member, a pinion on said block and in mesh with said arc, and means whereby the proper relation of said arc and pinion is maintained during tilting movement of said trailing frame.

5. A plow-carriage comprising a main frame, a trailing frame pivotally connected therewith, a cogged arc connected with said main frame, a movable block on said trailing frame, a pinion on said block and in mesh with said arc, and a lip on said block and overlapping said arc, whereby proper relation between said arc and pinion are maintained.

6. A plow-carriage comprising a main frame, a trailing frame pivotally connected therewith, an arc member connected with one of said frames, and rollers on the other of said frames and engaging said arc member, whereby friction between the frames is reduced during pivotal movement.

In testimony whereof we affix our signatures in presence of two witnesses.

JOHN Q. BLUE.
GUSTAVUS H. MARQUARDT.

Witnesses:
W. P. McElhinny,
J. C. Robb.